(12) United States Patent
Yang

(10) Patent No.: US 8,243,711 B2
(45) Date of Patent: Aug. 14, 2012

(54) METHOD FOR GENERATING AND REGISTERING IDENTIFICATION IN WIRELESS SENSOR NETWORK

(75) Inventor: Jin-young Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1314 days.

(21) Appl. No.: 11/362,336

(22) Filed: Feb. 27, 2006

(65) Prior Publication Data

US 2006/0215692 A1 Sep. 28, 2006

(30) Foreign Application Priority Data

Mar. 11, 2005 (KR) .................. 10-2005-0020587

(51) Int. Cl.
*H04J 3/24* (2006.01)
*H04J 3/16* (2006.01)
*H04W 4/00* (2009.01)
*H04L 12/28* (2006.01)

(52) U.S. Cl. ........ 370/349; 370/328; 370/389; 370/408; 370/466; 370/474

(58) Field of Classification Search ............... 379/90.01, 379/93.01, 93.26, 93.28, 93.31; 370/465, 370/466; 340/500, 531, 539.1; 455/418, 455/419

See application file for complete search history.

(56) References Cited

U.S. PATENT DOCUMENTS

| 7,197,573 | B1 * | 3/2007 | Jacobson et al. | 709/239 |
| 7,356,016 | B2 * | 4/2008 | Park et al. | 370/342 |
| 7,356,330 | B2 * | 4/2008 | Whittington et al. | 455/411 |
| 2004/0193653 | A1 * | 9/2004 | Howard et al. | 707/200 |
| 2005/0152285 | A1 * | 7/2005 | Shimizu et al. | 370/254 |
| 2005/0265261 | A1 * | 12/2005 | Droms et al. | 370/255 |
| 2005/0277471 | A1 * | 12/2005 | Russell et al. | 463/40 |

\* cited by examiner

*Primary Examiner* — Steven H Nguyen
*Assistant Examiner* — Jutai Kao
(74) *Attorney, Agent, or Firm* — Sughrue Mion, PLLC

(57) ABSTRACT

A method for generating and registering an identification in a wireless sensor network. The method includes generating an identification of a first layer node; transmitting the identification of the first layer node to a second layer node; detecting whether the identification of the first layer node is duplicated, using the second layer node; if the identification of the first layer node is not duplicated, transmitting a determination message from the second layer node to the first layer node; and determining the identification of the first layer node as a determined identification. The method further includes: if the second layer node does not have a determined identification, re-transmitting the identification of the first layer node after a predetermined period of time has lapsed. Therefore, an automatically identification allocating method using a hierarchical structure can be adopted to enable a distributed management.

16 Claims, 5 Drawing Sheets

METHOD FOR GENERATING AND REGISTERING IDENTIFICATION IN WIRELESS SENSOR NETWORK

CROSS-REFERENCE TO RELATED APPLICATIONS

This application claims priority from Korean Patent Application No. 2005-20587 filed on Mar. 11, 2005 in the Korean Intellectual Property Office, the disclosure of which is incorporated herein by reference.

BACKGROUND OF THE INVENTION

1. Field of the Invention

Methods consistent with the present invention related to efficiently generating and registering a node identification (ID) in a wireless sensor network.

2. Description of the Related Art

Ubiquitous computing technology is to create a ubiquitous space (i.e., a space in which information is exchanged through ubiquitous computers beyond recognition of human beings) in which invisible computers are installed in a large number of environments and objects, and connected to an electronic space so as to exchange information. In general, sensor nodes are connected to various kinds of sensors (light, temperature, humidity sensors and the like) in a ubiquitous computing environment in which a large number of invisible computers are embedded in an object and connected to a network so as to be managed.

Thus, an ID system for independently managing such sensors is required under the ubiquitous computing technology. That is, a method of classifying and naming many sensor nodes is required. A numbering method of allocating different IDs to sensor nodes in advance before installing the sensor nodes may be taken as an example of a method of automatically allocating IDs to sensor nodes. However, even in a case where the numbering method is used, human beings or servers are additionally required to manage IDs. Also, it is difficult to rapidly configure a wireless sensor network.

According to a random number generating method that is another method of allocating IDs to nodes, sensor nodes randomly select a number n from a number range from 1 to m and transmit the number n to a base station. If another sensor node does not solicit for the number n as an ID, the base station transmits the number n to a sensor node having solicited for the number n, and then the sensor node uses the number n as its ID. If not, a random number is re-generated, and then the above-described process is repeated. However, in the random number generating method, the random number may be duplicately generated, and control traffic may concentrate at the base station.

In a location based method as another method of allocating IDs to nodes, geographical location information as to sensor nodes are obtained using a global positioning system (GPS), and then an ID system is established based on geographical coordinate values. However, the location based method depends on location information and thus, is difficult to be applied to mobile nodes.

In a central managing method, sensor nodes solicit a base station for IDs, and the base station allocates IDS to the sensor nodes without duplicating the IDs. However, excessive traffic can occur at the base station.

Accordingly, a method of generating and registering an ID is required to solve the above problems. Also, integrated collection and management of hierarchical information and content information of sensor nodes must be achieved to provide accurate services that users demand. As a result, a method of generating and registering an ID including hierarchical information and content information is required.

SUMMARY OF THE INVENTION

The present invention provides a method of efficiently generating and registering an ID of a node in a wireless sensor network using a process of detecting whether the ID is duplicated.

According to an exemplary method of the present invention, there is provided a method for generating an identification in a wireless sensor network, including: generating an identification of a first layer node; transmitting the identification of the first layer node to a second layer node; detecting whether the identification of the first layer node is duplicated, using the second layer node; if the identification of the first layer node is not duplicated, transmitting a determination message from the second layer node to the first layer node; and determining the identification of the first layer node as a determined identification.

The method may further include: if the second layer node does not have a determined identification, then re-transmitting the identification of the first layer node after a predetermined period of time has lapsed.

If the identification of the first layer node is duplicated, the second layer node may transmit a duplicate message to the first layer node, and the first layer node may generate a new identification and transmit the new identification to the second layer node.

The method may further include: storing the determined identification of the first layer node in the second layer node. The identification may include a serial number. The generating of the identification of the first layer node, the transmitting of the identification of the first layer node to the second layer node, the detecting as to whether the identification of the first layer node is duplicated, using the second layer node, if the identification of the first layer node is not duplicated, transmitting the determination message from the second layer node to the first layer node, and the determining of the identification of the first layer node as the determined identification may be periodically repeated. The determination message may include the determined identification of the second layer node.

The method may further include: storing a u-identification of the first layer node comprising the determined identification, a layer information identification indicating a function of the first layer node, the determined identification of the second layer node, and information as to equipment directly connected to the first layer node.

The u-identification of the first layer node may further include information as to equipment directly connected to the first layer node. The equipment may be a sensor.

According to another exemplary embodiment of the present invention, there is provided a method of registering an identification in a wireless sensor network, including: transmitting a notification message from a first layer node to a second layer node; soliciting for a registration of a u-identification including a determined identification of the first layer node, a layer information identification indicating a function of the first layer node, a determined identification of the second layer node, and information as to equipment directly connected to the first layer node; registering the u-identification of the first layer node in the second layer node; and receiving a response message from the second layer node to inform the first layer node that the u-identification has been registered. When the second layer node registers u-identification, the second layer node may write out a u-identification registering table for the first layer node. The method may further include: storing a u-identification of the second layer node in the first layer node through the response message from the second layer node. The method may further include: if the u-identification registering table for the first layer node is written out, soliciting a third layer node for a registration of the u-identification registering table using the second layer node; and registering the u-identification registering table using the third layer node.

The method may further include: transmitting a table registration response message to the second layer node to inform the second layer node that the third layer node has registered the u-identification registering table. The transmitting of the notification message from the first layer node to the second layer node, the solicitation for the registration of the u-identification comprising the determined identification of the first layer node, the layer information identification indicating the function of the first layer node, the determined identification of the second layer node, and the information as to the equipment directly connected to the first layer node, the registering of the u-identification of the first layer node in the second layer node, and the receiving of the response message from the second layer node to inform the first layer node that the u-identification has been registered may be periodically repeated.

BRIEF DESCRIPTION OF THE DRAWINGS

The above and/or aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
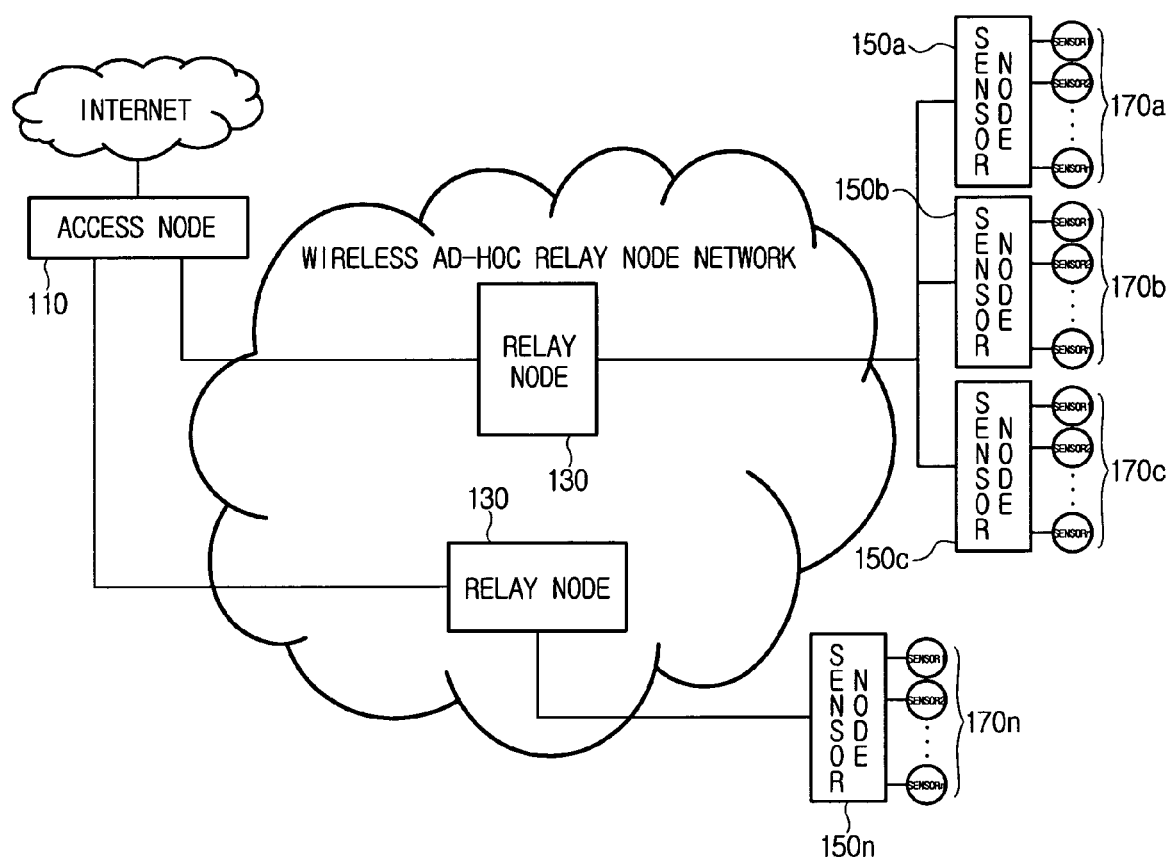
FIG. 1 is a view illustrating a configuration of a wireless sensor network using a method of generating and registering an ID in the wireless sensor network according to an exemplary embodiment of the present invention.

Exemplary embodiments of the present invention will be described in greater detail with reference to the accompanying drawings.

In the following description, same drawing reference numerals are used for the same elements even in different drawings. The matters defined in the description such as detailed construction and elements are provided to assist in a comprehensive understanding of the invention. Thus, it is apparent that the present invention may be carried out without those defined matters. Also, well-known functions or constructions are not described in detail since they would obscure the invention in unnecessary detail.

FIG. 1 is a view illustrating a configuration of a wireless sensor network using a method of generating and registering an ID in the wireless sensor network according to an exemplary embodiment of the present invention. Referring to FIG. 1, the wireless sensor network provides information collected from a plurality of sensors through a wireless medium in a format of necessary information to users and includes an access node 110, a relay node 130, sensor nodes 150a, 150b, 150c, . . . , and 150n, and a plurality of sensors 170a, 170b, 170c, . . . , and 170n.

The sensor nodes 150a, 150b, 150c, . . . , and 150n collect data from the plurality of sensors 170a, 170b, 170c, . . . , and 170n installed around the sensor nodes 150a, 150b, 150c, . . . , and 150n and transmit the data to the relay node 130 most closely directly connected to the sensor nodes 150a, 150b, 150c, . . . , and 150n by a wireless infrastructure. The relay node 130 transmits the data received from the sensor nodes 150a, 150b, 150c, . . . , and 150n to another relay node or the access node 110.

The access node 110 transmits the data received from the relay node 130 to an external network, for example the Internet. In other words, the access node 110 is an extension of the relay node 130, operates with the external network, and transmits the data obtained through the relay node 130 to a destination node processing the data as services.

Figure 2:
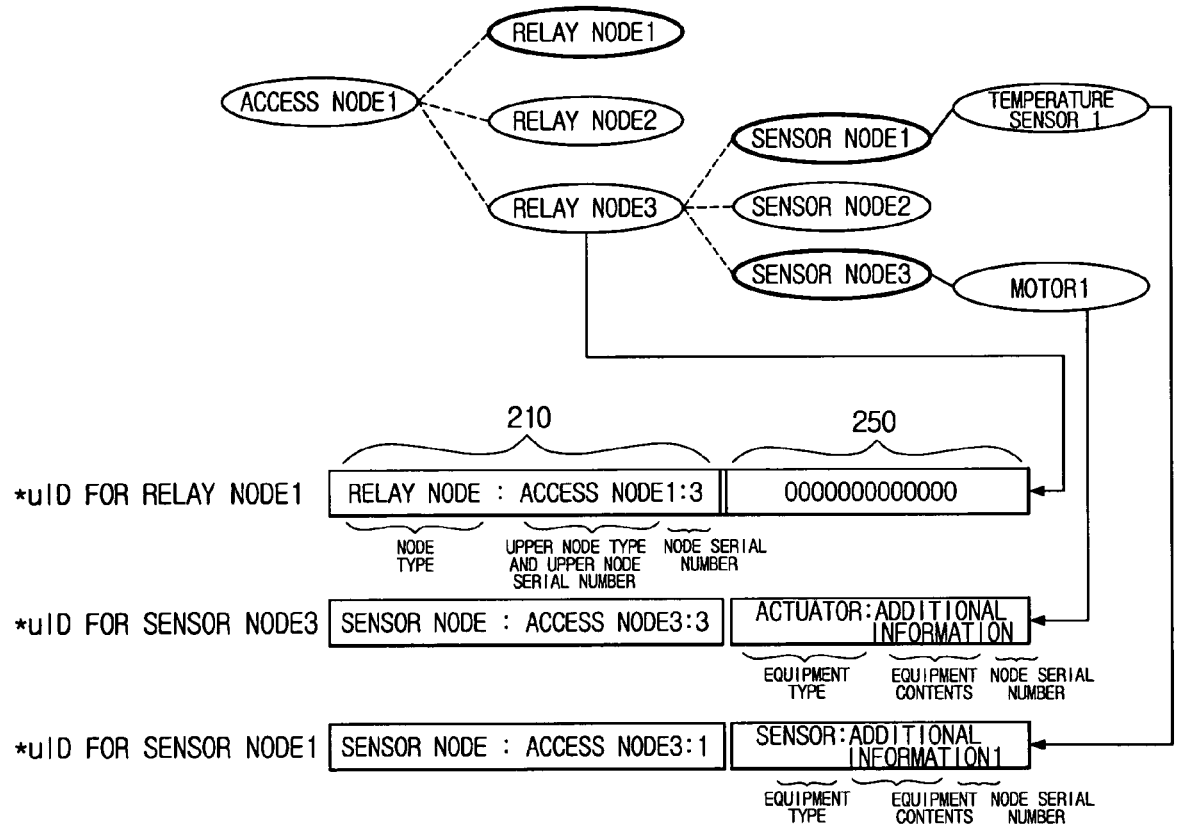
FIG. 2 is a view illustrating schematic structures of IDs of nodes according to an exemplary embodiment of the present invention.

FIG. 2 is a view illustrating schematic structures of u-IDs according to an exemplary embodiment of the present invention. Each of the u-IDs includes a determined ID 210 and an equipment ID 250.

The determined ID 210 is a node ID determined through a process of detecting whether an arbitrarily generated ID is duplicated and includes a node type, an upper node type, an upper node serial number, and a node serial number. Here, the node type indicates whether a corresponding node is a relay node, a sensor node, or an access node. The upper node type and the upper node serial number respectively indicate a type of an upper node of the corresponding node and a serial number of the upper node. Also, the node serial number indicates a serial number of the corresponding node.

The equipment ID 250 includes an equipment type, equipment contents, and an equipment serial number. The equipment ID 250 is an ID of equipment directly connected to the corresponding node, the equipment type indicates whether the corresponding equipment is an actuator or a sensor, and the equipment contents indicate other additional information as to the corresponding equipment. For example, the other additional information may be information as to a temperature sensor, a humidity sensor, and a pressure sensor. Also, the equipment serial number indicates a serial number of the corresponding equipment.

An exemplary method of generating an ID in a wireless sensor network according to the present invention will now be described. A corresponding node generates an equipment ID and then a determined ID to generate a u-ID. The equipment ID is directly generated by a node to which equipment such as a sensor or an actuator is installed. To generate the determined ID, information as to a node type is directly generated, and information as to an upper node type and an upper node serial number and a node serial number are allocated through distributed processing A process of allocating the upper node type, the upper node serial number, and the node serial number through the distributed processing will now be described. The generation of the node serial number is realized through two processes: generation of a temporary node serial number and a duplicated ID detection.

Figure 3:
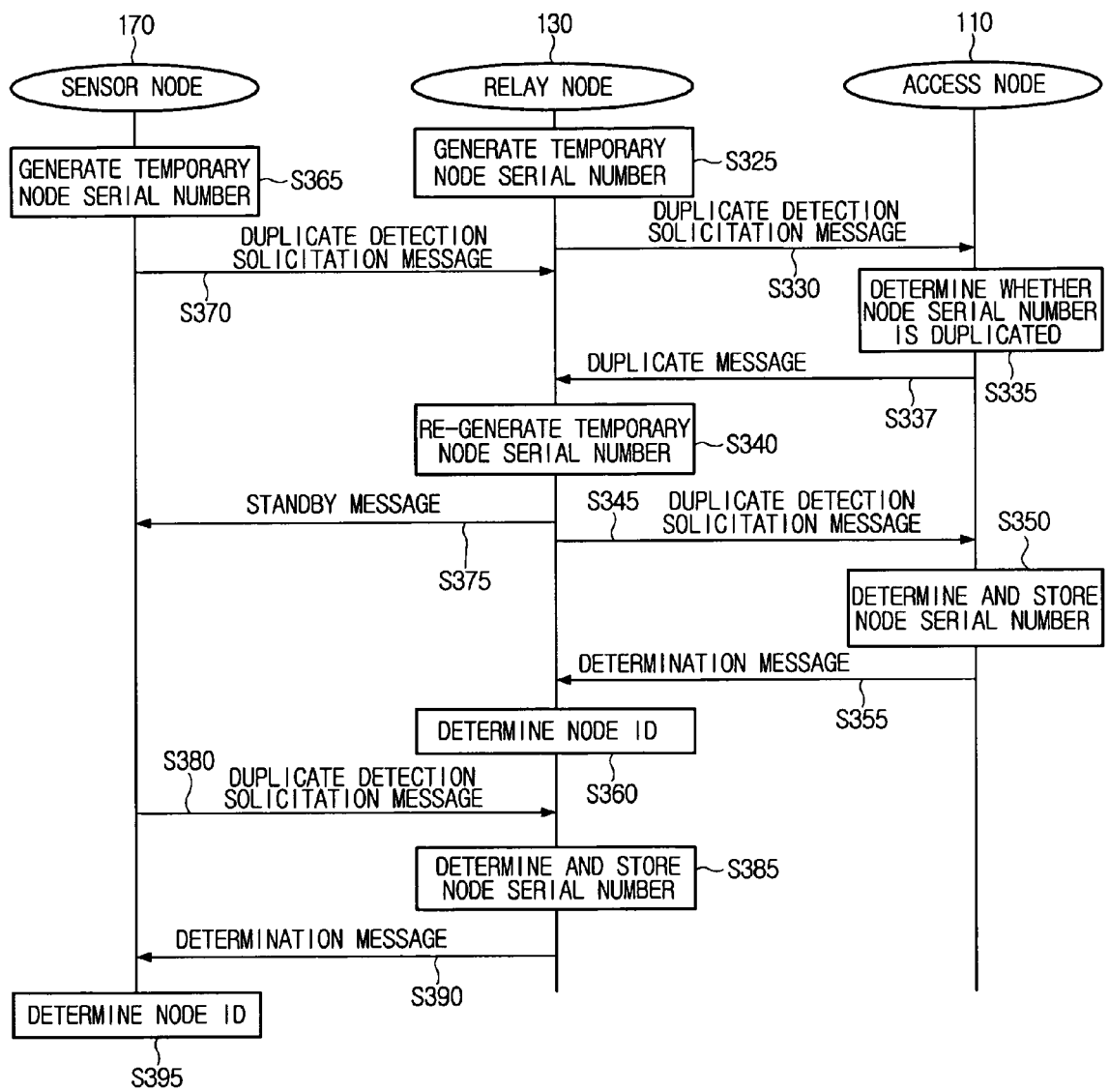
FIG. 3 is a flowchart of a method of generating an ID in a wireless sensor network according to an exemplary embodiment of the present invention.

FIG. 3 is a flowchart of a method of generating an ID in a wireless sensor network according to an exemplary embodiment of the present invention. Referring to FIG. 3, in operation S325, the relay node 130 generates a temporary node serial number thereof. In operation S330, the relay node 130 transmits a duplicate detection solicitation message to the access node 110 that is an upper node. In operation S335, the access node 110 determines whether the temporary node serial number having been solicited for a duplicate detection is duplicated (has been allocated to another node). If the access node 110 determines in operation S335 that the temporary node serial number is duplicated, in operation S337, the access node 110 transmits a duplicate message to the relay node 130.

In operation S340, the relay node 130 having received the duplicate message re-generates a temporary node serial number after a predetermined period of time has lapsed. In operation S345, the relay node 130 re-transmits the duplicate detection solicitation message to the access node 110. If the access node 110 determines in operation S335 that the temporary node serial number is not duplicated, in operation S350, the access node 110 determines and stores the node serial number. In operation S355, the access node 110 transmits a determination message to the relay node 130. In operation S360, the relay node 130 determines the node serial number as a node serial number thereof to generate a determined ID thereof. Here, the relay node 130 determines the upper node type and the upper node serial number constituting the determined ID 210 as a node type and a node serial number of the access node 110 having transmitted the determination message. The determined ID 210 generated through such a process and the equipment ID 250 constitute a u-ID of the relay node 130.

Describing a process of generating a node serial number of a sensor node 170, in operation S365, the sensor node 170 generates a temporary node serial number thereof. In operation S370, the sensor node 170 transmits the duplicate detection solicitation message to the relay node 130 that is an upper node. If the relay node 130 having received the duplicate detection solicitation message does not generate the determined ID thereof, the relay node 130 transmits a standby message to the sensor node 170 in operation S375. In operation S380, the sensor node 170 having received the standby message re-transmits the duplicate detection solicitation message to the relay node 130 after a predetermined period of time has lapsed.

If the relay node 130 receives the duplicate detection solicitation message again and has generated the determined ID thereof, the relay node 130 determines whether the node serial number is duplicated. If the relay node 130 determines that the node serial number is not duplicated, the relay node 130 determines and stores the node serial number in operation S385. In operation S390, the relay node 130 transmits the determination message to the sensor node 170. In operation S395, the sensor node 170 determines the node serial number as a node ID thereof.

Here, the sensor node 170 determines an upper node type and an upper node serial number constituting the determined ID 210 thereof as a node type and a node serial number of the relay node 130 having transmitted the determination message. The determined ID generated through this process and the above-described equipment ID constitute a u-ID of the sensor node 170. u-IDs generated through the above-described process are all registered in an access node. A process of registering a generated u-ID will now be described.

Figure 4:
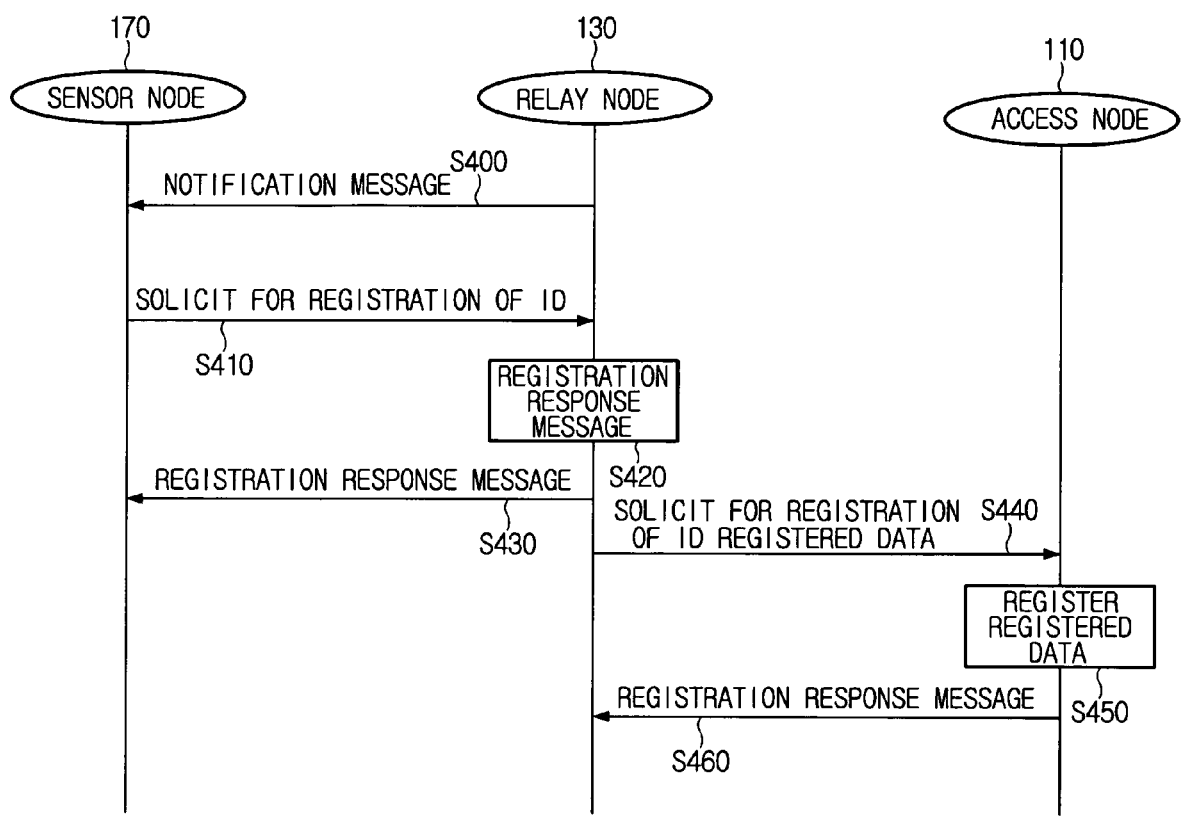
FIG. 4 is a flowchart of a method of registering an ID in a wireless sensor network according to an exemplary embodiment of the present invention.

FIG. 4 is a flowchart of a method of registering an ID in a wireless sensor network according to an exemplary embodiment of the present invention. Referring to FIG. 4, in operation S400, the relay node 130 transmits a notification message to notify an identity thereof to the sensor node 170 that is a lower node. In operation S410, the sensor node 170 receives the notification message from the relay node 130 and transmits a registration solicitation message to the relay node 130 to solicit the relay node 130 to register a u-ID thereof.

In operation S420, the relay node 130 writes out a u-ID registering table and registers the u-ID in the u-ID registering table. In operation S430, the relay node 130 transmits a registration response message to the sensor node 170 to inform the sensor node 170 that the u-ID has been registered. In operation S440, the relay node 130 transmits a message to the access node 110 to solicit for a registration of the u-ID registering table including information as to a u-ID thereof and information as to the u-ID of the sensor node 170.

In operation S450, the access node 110 registers the u-ID registering table. In operation S460, the access node 110 transmits a registration response message to the relay node 130 to inform the relay node 130 that the u-ID registering table has been registered.

The above-described processes of generating and registering the u-ID may be periodically repeated. Thus, although the u-ID varies with a variation in related information as to a sensor node and a relay node, the u-ID is periodically updated and registered. As a result, the sensor node and the relay node can be managed and controlled.

Figure 5:
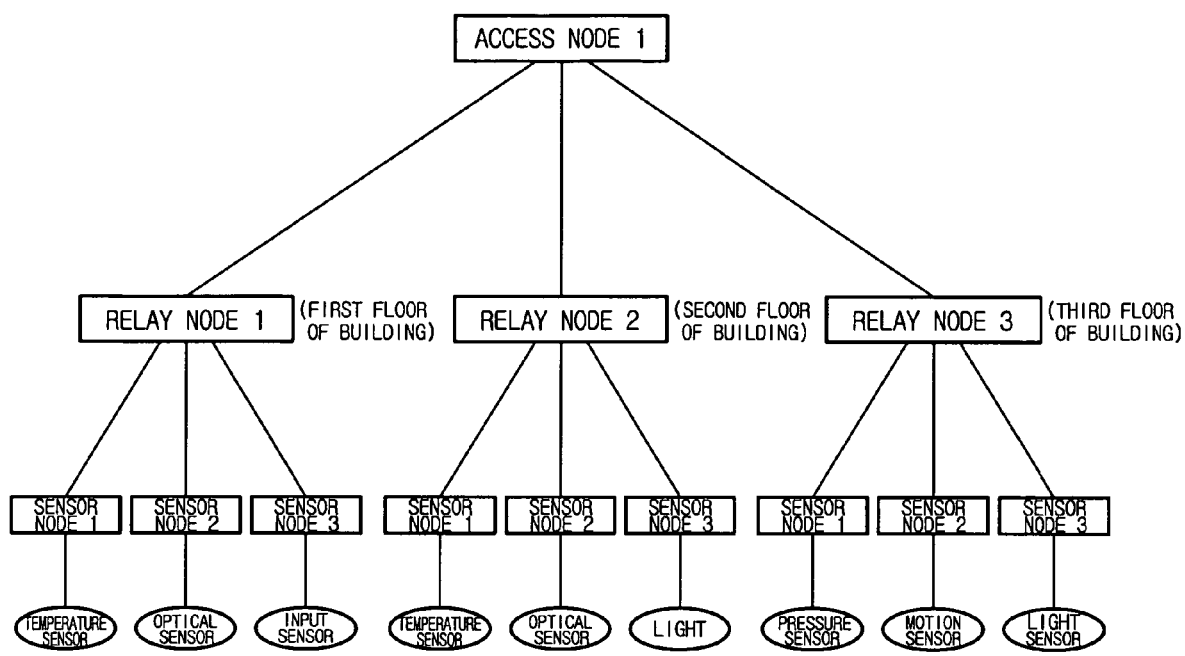
FIG. 5 is a view illustrating a portion of a node structure in a building integrated management system using a method of registering an ID according to an exemplary embodiment of the present invention.

FIG. 5 is a view illustrating a portion of a node structure in a building integrated management system using a method of registering an ID according to an exemplary embodiment of the present invention. For the first floor of a building, a sensor node 1 to which a temperature sensor is connected, a sensor node 2 to which an optical sensor is connected, and a sensor node 3 to which a pressure sensor is connected are connected to a relay node 1. For the second floor of the building, a sensor node 1 to which a temperature sensor is connected, a sensor node 2 to which an optical sensor is connected, and a sensor node 3 to which a light sensor is connected are connected to a relay node 2. For the third floor of the building, a sensor node 1 to which a pressure sensor is connected, a sensor node 2 to which a motion sensor is connected, and a sensor node 3 to which a light sensor is connected are connected to a relay node 3.

In a case where the method of generating and registering the ID according to the present invention is not used, middleware must transmit a query including requirements to all of the nodes to obtain information corresponding to the query required for each application. As a result, only a particular node of the nodes satisfying the requirements transmits information to the middleware to respond to the query. For example, in a case where a temperature in the building is to be checked, middleware according to the related art transmits the query to the relay nodes 1, 2, and through an access node 1 and waits for responses from all of sensors through the above-described relay nodes.

However, according to the present invention, hierarchical structures of all nodes and information of sensors can be obtained using only ID structures. Thus, a query can be transmitted to only a node to which a desired sensor is connected. In other words, if a temperature in the building is to be checked, a query may be transmitted only to sensor nodes connected to the temperature sensors through the relay nodes 1 and 2 corresponding to the first and second floors in which the temperature sensors are installed. As a result, a number of nodes receiving the query from the middleware can be reduced, and thus the total energy consumption can be reduced.

As described above, in a method for generating and registering an ID in a wireless sensor network according to the present invention, an automatically ID allocating method using a hierarchical structure can be adopted to enable a distributed management. Thus, a concentration of a load on an access node can be prevented. As a result, a parallel operation can be performed, and thus, time efficiency can be maximized in the generation and registration of the ID.

Also, the ID can represent information as to the characteristics of nodes and sensors. Thus, a capacity of a database to be managed can be reduced. If a problem occurs in the database, middleware can easily maintain necessary backup data due to a small size of the necessary backup data. In addition, efficiency of routing can be improved using topology information on the ID. Moreover, low power/high performance management of the ID suitable in a ubiquitous computing environment can be achieved.

The foregoing exemplary embodiments and advantages are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for generating an identification in a wireless sensor network, the method comprising:
    temporarily generating an identification of a first layer node by the first layer node;
    transmitting the identification of the first layer node to a second layer node;
    detecting whether the identification of the first layer node is duplicated, using the second layer node;
    transmitting a determination message from the second layer node to the first layer node when the second layer node detects that the identification of the first layer node is not duplicated; and
    determining the identification of the first layer node as a determined identification by the first layer node upon receiving the determination message;
    wherein the first and second layer nodes are in a hierarchical relationship such that the first layer node is a subordinate of the second layer node,
    wherein the identification of the first layer node is registered in an access node, and
    wherein the identification of the first layer node includes a node type and a serial number of the first layer node and a node type and a serial number of the second layer node which is an upper node of the first layer node.

2. The method of claim 1, further comprising
    re-transmitting the identification of the first layer node after a predetermined period of time has lapsed if the second layer node does not have a determined identification.

3. The method of claim 1, wherein when the identification of the first layer node is duplicated, the second layer node transmits a duplicate message to the first layer node, and the first layer node generates a new identification and transmits the new identification to the second layer node.

4. The method of claim 1, further comprising storing the determined identification of the first layer node in the second layer node.

5. The method of claim 1, further comprising periodically repeating the generating of the identification of the first layer node, the transmitting of the identification of the first layer node to the second layer node, the detecting whether the identification of the first layer node is duplicated, using the second layer node, when the identification of the first layer node is not duplicated, the transmitting the determination message from the second layer node to the first layer node, and the determining of the identification of the first layer node as the determined identification.

6. The method of claim 1, wherein the determination message comprises the determined identification of the second layer node.

7. The method of claim 6, wherein the u-identification of the first layer node further comprises information as to equipment directly connected to the first layer node.

8. The method of claim 7, wherein the equipment comprises a sensor.

9. The method of claim 1, further comprising:
    storing a u-identification of the first layer node comprising the determined identification, a layer information identification indicating a function of the first layer node, a determined identification of the second layer node, and information as to equipment directly connected to the first layer node.

10. A method of registering an identification in a wireless sensor network, the method comprising:
    transmitting a notification message from a first layer node to a second layer node;
    soliciting for a registration of a u-identification;
    registering the u-identification of the first layer node in the second layer node; and
    receiving a response message from the second layer node to inform the first layer node that the u-identification has been registered,
    wherein the u-identification comprises a determined identification of the first layer node, a layer information identification indicating a function of the first layer node, a determined identification of the second layer node, and information as to equipment directly connected to the first layer node,
    wherein the u-identification of the first layer node is registered in an access node, and
    wherein the identification of the first layer node includes a node type and a serial number of the first layer node and a node type and a serial number of the second layer node which is an upper node of the first layer node.

11. The method of claim 10, wherein when the second layer node registers u-identification, the second layer node writes out a u-identification registering table for the first layer node.

12. The method of claim 11, further comprising soliciting a third layer node for a registration of the u-identification registering table using the second layer node if the u-identification registering table for the first layer node is written out; and
    registering the u-identification registering table using the third layer node.

13. The method of claim 11, further comprising transmitting a table registration response message to the second layer node to inform the second layer node that the third layer node has registered the u-identification registering table.

14. The method of claim 10, further comprising storing a u-identification of the second layer node in the first layer node through the response message from the second layer node.

15. The method of claim 10, further comprising periodically repeating the transmitting of the notification message from the first layer node to the second layer node, the solicitation for the registration of the u-identification comprising the determined identification of the first layer node, the layer information identification indicating the function of the first layer node, the determined identification of the second layer node, and the information as to the equipment directly connected to the first layer node, the registering of the u-identification of the first layer node in the second layer node, and the receiving of the response message from the second layer node to inform the first layer node that the u-identification has been registered.

16. The method of claim 10, wherein the first and second layer nodes are in a hierarchical relationship such that the second layer node is a subordinate of the first layer node.

* * * * *